United States Patent [19]

Strong

[11] Patent Number: 5,530,846

[45] Date of Patent: Jun. 25, 1996

[54] SYSTEM FOR DECOUPLING CLOCK AMORTIZATION FROM CLOCK SYNCHRONIZATION

[75] Inventor: Hovey R. Strong, San Jose, Calif.

[73] Assignee: International Business Machines Corporation, Armonk, N.Y.

[21] Appl. No.: 175,040

[22] Filed: Dec. 29, 1993

[51] Int. Cl.⁶ .................................................. G06F 1/12
[52] U.S. Cl. ............................................................ 395/550
[58] Field of Search .............................................. 395/550

[56] References Cited

U.S. PATENT DOCUMENTS

| | | | |
|---|---|---|---|
| 3,701,940 | 10/1972 | Nisson | 324/1 |
| 4,531,185 | 7/1985 | Halpern et al. | 364/200 |
| 4,584,643 | 4/1986 | Halpern et al. | 364/200 |
| 4,882,739 | 11/1989 | Potash et al. | 375/109 |
| 4,890,303 | 12/1989 | Bader | 375/107 |
| 5,027,375 | 6/1991 | Ernst | 375/107 |
| 5,052,026 | 9/1991 | Walley | 375/119 |
| 5,052,028 | 9/1991 | Zwack | 375/109 |
| 5,062,124 | 10/1991 | Hayashi et al. | 375/107 |
| 5,124,976 | 6/1992 | Lemaistre et al. | 370/29 |
| 5,428,645 | 6/1995 | Dolev et al. | 375/354 |
| 5,452,435 | 9/1995 | Malouf et al. | 395/550 |

OTHER PUBLICATIONS

Frank Schmuck & Flaviu Cristian, IBM Almaden Research Center, "Continuous Clock Amortization Need Not Affect the Precision of a Clock Synchronization Algorithm", ©1990 Association for Computing Machinery, pp. 133–143.

F. Cristian, D. Dolev & H. R. Strong, "Decentralizing Technique Applied to Master–Slave Clock Synchronization", IBM Technical Disclosure Bulletin, vol. 33, No. 8, Jan. 1991, pp. 107–109.

Scott E. Farleigh, Application for Canadian Patent, No. 2.060,462, "Apparatus and Method for Timing Distribution Over an Asynchronous Ring", CCA 3254 (10–89), pp. 1–16 & drawing (3 pages.).

Fujifacon Corp., Patent Application, JP04294413–A, "Time adjusting device for network system connecting main station and multiple substations", Oct. 19, 1992, pp. 79–87.

R. W. Harper, "Method of Keeping and Synchronizing Time in a Message–Passing Distributed System", IBM Technical Disclosure Bulletin, vol. 32, No. 12, May 1990, pp. 422–425.

W. Ernst, Siemens AG, Patent Application, EP–391144, "Clock synchronization device for digital communications network", Oct. 10, 1990, pp. 1–4.

F. Cristian, "Probabilistic Clock Synchronization", IBM Technical Disclosure Bulletin, vol. 31, No. 2, Jul. 1988, p. 91.

Flaviu Cristian, IBM Almaden Research Center, "Probalistic Clock Synchronization", Research Report, Computer Science Sep. 23, 1988, pp. 1–20.

Primary Examiner—Thomas M. Heckler
Attorney, Agent, or Firm—Baker, Maxham, Jester & Meador

[57] ABSTRACT

A method for accommodating frequent discrete clock synchronization adjustments while maintaining a continuous logical clock time that amortizes the adjustments at a predetermined rate. Two distinct logical clocks are used to decouple clock synchronization procedures from adjustment amortization procedures. One logical clock is discretely synchronized to an external time reference and a second logical clock is adjusted with amortization to provide a continuous monotonically non-decreasing logical clock time.

19 Claims, 5 Drawing Sheets

SYSTEM FOR DECOUPLING CLOCK AMORTIZATION FROM CLOCK SYNCHRONIZATION

BACKGROUND OF THE INVENTION

1. Field of the Invention

This invention relates generally to the synchronization of clocks in distributed digital systems and particularly to a method for logically decoupling monotonic amortization of synchronization errors from frequent clock synchronization events.

2. Discussion of the Related Art

In distributed computer systems, clock synchronization is necessary to coordinate the actions of different processors. Clock synchronization procedures can be generally classified as either internal or external. Internal clock synchronization procedures operate to hold processor clocks within some maximum relative deviation from each other. External clock synchronization features operate to hold each processor clock within some maximum absolute deviation from an external real-time reference.

All clock synchronization procedures include periodic, "synchronization events", which herein denominate periodic adjustments to a logical clock time. A synchronizing adjustment is valued so that a "logical" clock time, obtained by adding an "offset" to a "hardware" clock time, is synchronized to the appropriate internal or external standard. The "offset" is repeatedly "adjusted" to maintain a certain synchronization "precision" without adjusting the hardware clock.

A "discrete" adjustment causes the logical clock to instantaneously leap ahead or back, thereafter continuing to run at the "base rate" of the underlying hardware clock. Discrete logical clocks are generally neither monotonic nor continuous and many distributed applications requiring clock synchronization cannot tolerate discontinuous logical clock behavior.

The problems of discontinuity in discrete logical clocks can be overcome by "amortizing" (i.e., distributing) the adjustment continuously over a time interval by increasing or decreasing the base rate of the logical clock relative to the hardware clock during an "amortization interval".

Thus, the problem of clock synchronization in distributed systems is two-fold; a "precision" requirement is imposed on synchronization accuracy with respect to the internal or external standard, and a "smoothness" requirement is imposed for temporal monotonicity and continuity of the clock time. The fundamental problem in the art is that when clock synchronization events occur too closely to one another, amortization of the clock adjustments for earlier synchronizations may be incomplete and the remaining non-amortized difference may distort the results of later synchronization.

Until recently, it was widely believed in the art that the only sure way to overcome this problem is to impose an upper limit on the frequency of synchronization events. This wide-spread belief led directly to the contention that amortization negatively affects the precision achievable by a clock synchronization procedure. Unfortunately, imposing an upper frequency limit on synchronization events does limit precision and is thus unacceptable for clock synchronization procedures that attempt to maintain a given precision by scheduling synchronization events responsive to estimated error rather than according to a standard schedule.

Practitioners in the art have suggested several clock synchronization procedures intended to overcome the problems introduced in distributed computer systems. For instance, in U.S. Pat. No. 4,882,739, Richard J. Potash et al. discloses a method for adjusting clocks in several data processors to a common time base. Potash et al. exchange time signals between a master clock at a central location and several slave clocks at various remote locations so that the round-trip transmission time can be measured and incorporated in each synchronizing event. Also, the ratio between central and remote clock frequencies is measured and used to continuously adjust each remote clock.

Other practitioners have disclosed synchronization procedures involving round-trip transmission time measurements in a fashion similar to that of Potash et al. In U.S. Pat. No. 5,052,028, Eduard Zwack discloses a phase synchronization method for clock signals in a communications network that relies on round-trip data flow. In Canadian Patent 2,060,462, Scott E. Farleigh discloses a timing distribution method for an asynchronous fiber optic ring network wherein a master node provides timing information that is used at any ring node to synchronize the local node clock by transferring a measure of propagation delay. Japanese Patent 4-294413 discloses a similar network system time adjusting technique as does U.S. Pat. No. 5,062,124.

The clock synchronization procedures requiring accurate round-trip propagation delay data are subject to errors arising from transmission faults and several practitioners have accordingly suggested fault-tolerant master-slave clock synchronization procedures for distributed systems. For instance, F. Christian et al. (IBM Technical Disclosure Bulletin, Vol. 33, No. 8, pp. 107–109, January 1991) describe a method for convening a master-slave clock synchronization protocol into a decentralized clock synchronization protocol that accommodates multiple time signal sources and multiple processor failures. Similarly, F. Christian (IBM Technical Disclosure Bulletin, Vol. 31, No. 2, p. 91, July 1988) discloses a protocol for synchronizing the clock of a slave processor with the clock of the master processor using a variable delay between synchronization events derived from the probability of achieving the requisite precision. Christian provides a synchronization procedure for distributed systems subject to unbounded random communication delays, including indefinite delays arising from communication and clock failures. Also, co-pending patent application Ser. No. 07/970,666 filed on Nov. 3, 1992 and assigned to the Assignee hereof discloses an anonymous time synchronization method that requires few round-trip or hand-shaking messages because each network node generally synchronizes itself based on eavesdropping on anonymous messages from other nodes.

Although the above practitioners provide useful solutions to the synchronization precision problem, none suggest or consider solutions to the synchronization smoothness problem. However, in U.S. Pat. No. 4,584,643, Joseph Y. Halpern et al. disclose a decentralized synchronization method that synchronizes distributed clocks in the presence of faults, guaranteeing that no clock in a correct processor ever deviates from another such clock by more than some maximum deviation. This internal synchronization technique relies on "unforgeably signed" time messages from the several system nodes. Also, in U.S. Pat. No. 4,531,185, Halpern et al. disclose a centralized version of their clock synchronization process. Both centralized and decentralized processes impose smoothness constraints that require a correct clock never be adjusted by more than a maximum amount during a predetermined time period and that further require that a corrected clock never be set back. These requirements address the synchronization smoothness problem by forcing the local clocks to remain piece-wise linear and monotonically non-decreasing.

Until now, few practitioners have considered the combined precision and smoothness problem, primarily because of a wide-spread belief that the two problems are not compatibly resolvable. Frank Schmuck and Flaviu Christian ("Continuous Clock Amortization Need Not Affect the Precision of a Clock Synchronization Algorithm", Proc. 9th Association of Computing Machinery Symposium on Principles of Distributed Computing, pp. 133–143, 1990) for the first time describe the theoretical conditions that must be imposed on a distributed computing system to permit compatible solutions to the two clock synchronization precision and smoothness problems. Schmuck et al. provide theoretical proof that amortization can be added to existing internal and external clock synchronization processes under some circumstances without worsening synchronization precision.

Schmuck et al. demonstrate that if the amortization rate is no smaller than the maximum hardware clock drift rate, then amortization causes no loss of precision for external clock synchronization processes. Unfortunately, they also find that fast amortization alone is not sufficient to preserve precision in a discrete internal clock synchronization process without further limiting the internal process so that all clocks are resynchronized within a small real-time interval during which both old and new clocks must stay synchronized. These additional limitations require all amortization to be completed before the next synchronizing event for internal synchronization procedures, which is the general limitation already known in the art.

Thus, even the iconoclastic theoretical work of Schmuck et al. does not offer a solution to the internal synchronization problem where synchronization events must occur too frequently to allow complete amortization of previous clock adjustments. Moreover, although Schmuck et al. showed that external synchronization processes require only that the amortization rate be faster than the hardware clock drift rate, they discuss only theoretical proofs and do not disclose or suggest useful embodiments of synchronization systems that solve both precision and amortization problems.

There is accordingly a clearly felt need in the art for a clock synchronization process that permit amortization of clock adjustments to provide smooth monotonic time in external and internal clock synchronization processes without an upper synchronization frequency limit that unacceptably limits clock precision: These unresolved problems and deficiencies are clearly felt in the art and are solved by this invention in the manner described below.

SUMMARY OF THE INVENTION

This invention solves the above problem for the first time by decoupling synchronization from amortization. The two elements are decoupled by using two distinct logical clocks, reserving one for the discrete adjustments that are made instantaneously to preserve precision and reserving the other for amortized adjustments that are made slowly to preserve monotonicity and piece-wise linearity. The second logical clock operates as a slave to the first, thereby decoupling amortization from clock synchronization.

It is an object of the clock synchronization procedure of this invention to provide a predetermined precision in a monotonically non-decreasing continuous clock function. It is an advantage of the procedure of this invention that clock synchronization precision is independent of the amortization process:

It is another object of the clock synchronization procedure of this invention to provide a monotonically non-decreasing continuous clock function having an arbitrarily small synchronization precision. It is yet another object of the procedure of this invention to provide a smooth precise clock function that can be discretely adjusted for political time changes, such as leap seconds, daylight savings time, and the like. It is a feature of the process of this invention that discrete political adjustments can be added to the smooth, arbitrarily precise logical clock function.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Detailed Description of the Problem

A "clock" herein denominates an object that can be accessed so that it returns a number that is a function of time. The time-of-day clock of a data processor is an example of a clock that is herein denominated a "hardware" clock. The hardware clock of a data processor is used to monitor real-time processes. Thus, if any real-time processes are to be coupled to a data processor, the hardware clock should not be changed or modified. However, the time-of-day shown by a hardware clock must be modified for several purposes, including to give it an initial setting, to adjust it to more accurately reflect real-time and to arrange for political time changes including daylight savings, leap seconds and the like.

A "logical clock" herein denominates a clock object structured to be a modifiable function of a hardware clock, thereby avoiding need for direct modification of the hardware clock. When adjustment of time-of-day is required to synchronize it with a reference time-of-day or to include political time changes, such adjustments can be made to a logical clock without directly controlling the associated hardware clock. As used herein, a logical clock is an object that provides for the return of a function of the time values produced by a hardware clock. In a "smooth" or "continuous" logical clock, this function is piece-wise linear, continuous and monotonically non-decreasing. An undisturbed hardware clock provides a monotonically non-decreasing step function of real-time having a "base rate". As used herein, "time" denominates a data type inheriting the properties of real numbers and generally represents "time-of-day".

Figure 1:
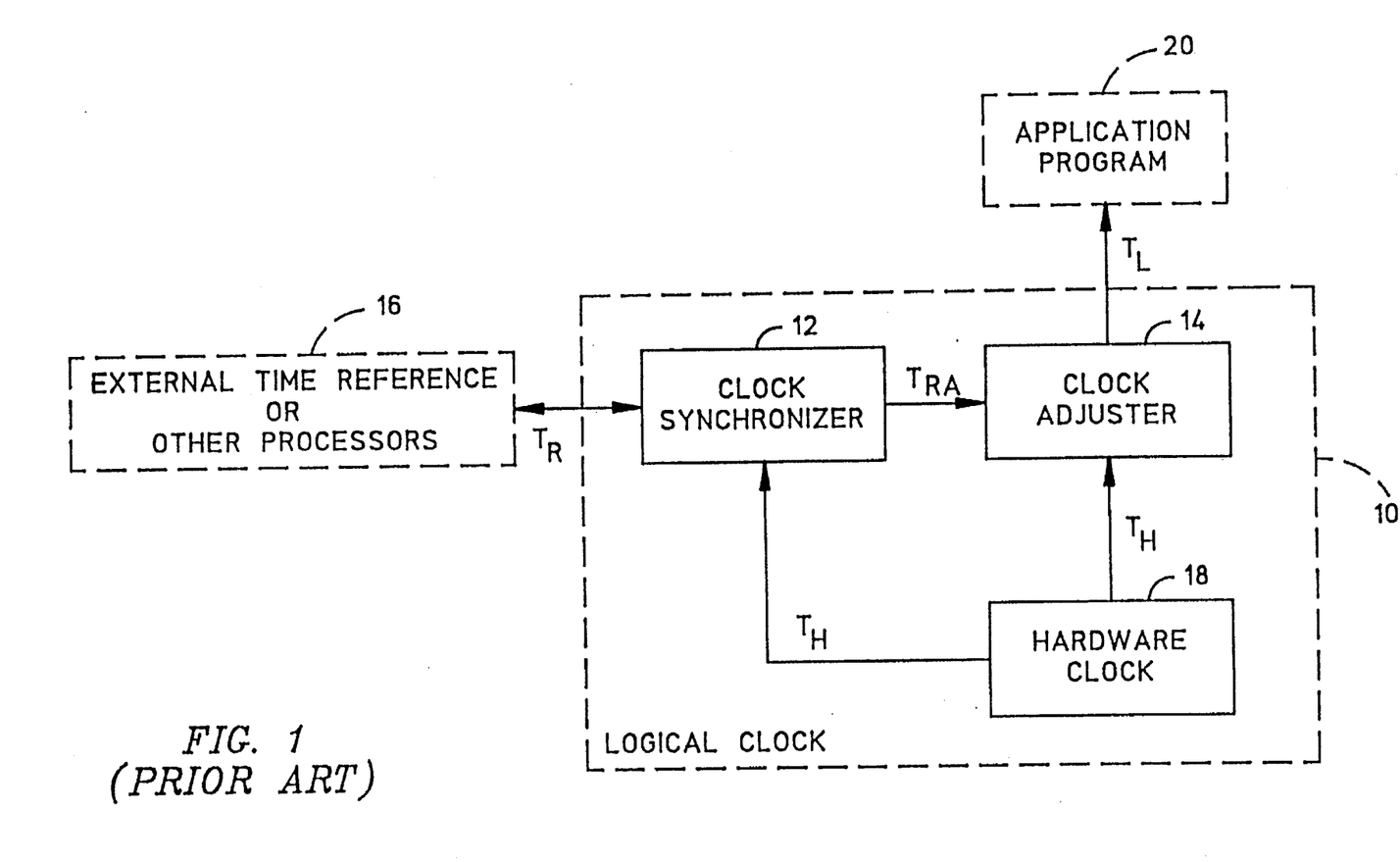
FIG. 1 is a functional block diagram of a clock synchronization system from the prior art.

FIG. 1 illustrates a clock synchronization system known in the art. The system includes a logical clock 10 having a clock synchronizer 12 and a clock adjustor 14. Clock synchronizer 12 periodically reads an external reference time-of-day $T_R$ from a reference source 16. Reference source 16 may be an external reference clock in an externally synchronized system or it may represent message exchanges with other processors in an internally synchronized system.

Thus, clock synchronizer 12 updates an internally stored value for the reference time-of-day $T_{RA}$ according to some synchronization schedule. When an application program 20 asks for the current time-of-day, clock adjustor 14 uses the $T_{RA}$ value from clock synchronizer 12 computed at the last resynchronization event plus the time passed since that event as measured by the hardware clock 18, which provides a hardware clock time signal $T_H$ to both clock synchronizer 12 and clock adjustor 14. Clock adjuster 14 provides the resulting logical clock time-of-day value $T_L$ to application program 20.

It can be readily appreciated that clock adjuster 14 operates to isolate hardware clock 18 from the frequent resynchronizing events orchestrated by clock synchronizer 12. With this arrangement, hardware clock 18 need only provide acceptably accurate base rate information between adjacent synchronizing events. Clock adjuster 14 can be described as an abstract data object supporting a clock adjustment function called by clock synchronizer 12 at each resynchronization event and a clock reading function called by application program 20 to obtain the current logical time-of-day.

Figure 3:
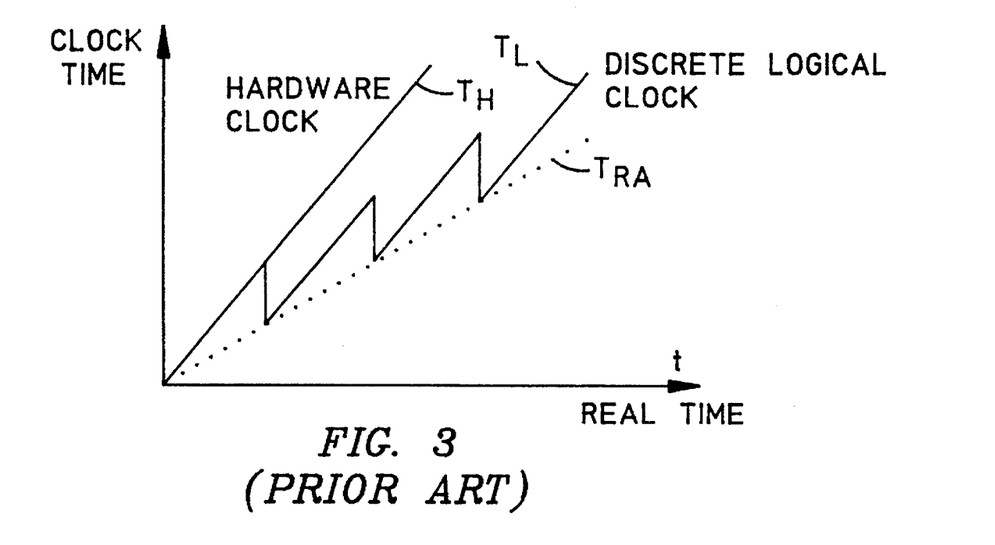
FIG. 3 is a chart illustrating a discrete logical clock from the prior art.

The simplest clock adjuster known in the art is the discrete clock adjuster whose operation is illustrated in FIG. 3. FIG. 3 shows that logical clock time $T_L$ is computed by adding the adjusted reference time $T_{RA}$ at the last resynchronization to the time passed since then determined at the hardware clock base rate. The discrete clock synchronization system is said to implement a "discrete logical clock" because the logical clock is adjusted in discrete steps at each resynchronization event. In FIG. 3, for example, the hardware clock time $T_H$ runs too fast relative to reference time $T_{RA}$ and thus the discrete logical clock time $T_L$ is periodically set back to remain in synchrony with reference time $T_{RA}$.

Figure 4:
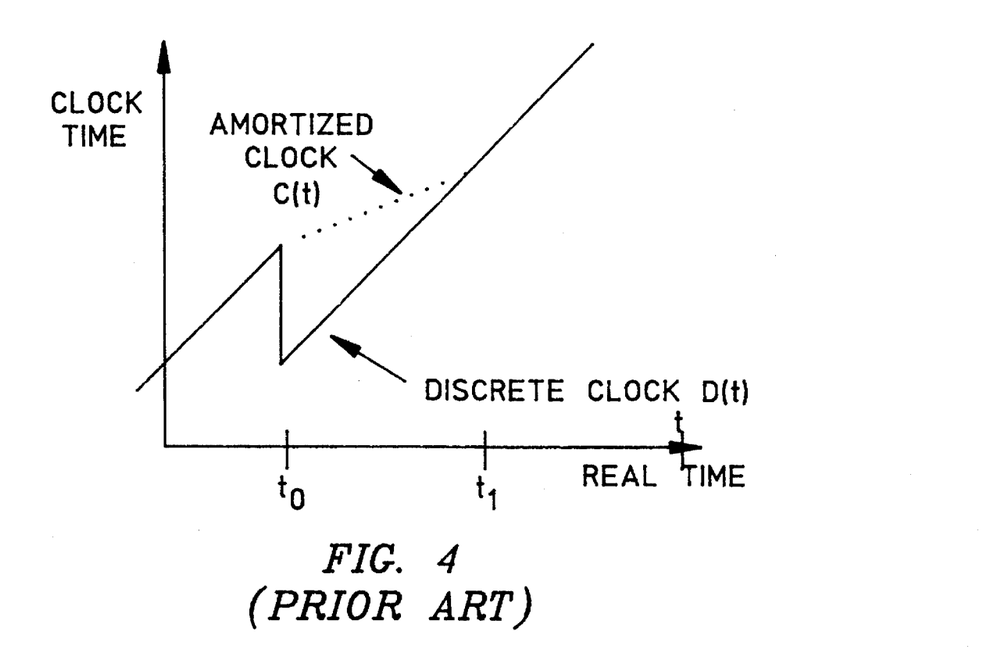
FIG. 4 is a chart illustrating a continuous logical clock from the prior art.

FIG. 4 illustrates another clock adjuster, denominated a "linearly amortizing adjuster". Instead of making a discrete adjustment, the amortizing adjuster causes the logical clock to run faster or slower than the hardware clock for a certain amount of time, denominated the "amortizing time". For example, at time $t_0$ in FIG. 4, when a discrete logical clock makes a jump downward, the amortized logical clock instead remains continuous and monotonic, but is set to run slower than the hardware clock rate represented by the slope of the discrete clock time line D(t). The slower amortized logical clock C(t) continues until the end of the amortizing time interval at time $t_1$ when the amortized clock rate is reset to the hardware clock rate. The linearly amortizing logical clock rate is set faster if a discrete adjustment must increase the current logical time (positive amortization) and slower if it must decrease the logical time (negative amortization). This can be done in the clock adjusting function by multiplying or dividing the $T_H$ time values from hardware clock 18 by a constant factor of (1+α), where parameter α is denominated the "amortization rate".

In the example shown in FIG. 4, the amortization rate is constant and the amortization period is chosen according to the size of the necessary adjustment. Rather than explicitly computing the length of the amortization period, the clock adjusting function may detect the end of amortization when the amortized logical clock time equals a corresponding discrete logical clock time. For instance, after a negative adjustment, amortization ends just when the slower amortizing clock C(t) first falls behind an equivalent discrete logical clock D(t).

When the linearly amortizing clock adjuster is used in the logical clock of FIG. 1, it is denominated an amortizing clock synchronization system that implements an amortized logical clock. The amortized clock known in the art never leaps forward or backward and, with an amortization rate of α, its speed deviates from the real-time rate by no more than a predetermined factor. To keep this factor small, the usual practice is to choose a small amortization rate α. However, the clock synchronization system precision suffers if α is small because of continuing drift during the longer amortization time periods.

As discussed in detail in the above-cited Schmuck et al. reference, amortization affects synchronization precision in both externally synchronized and internally synchronized logical clock systems but the problem is more severe for the internally synchronized system.

Figure 5:
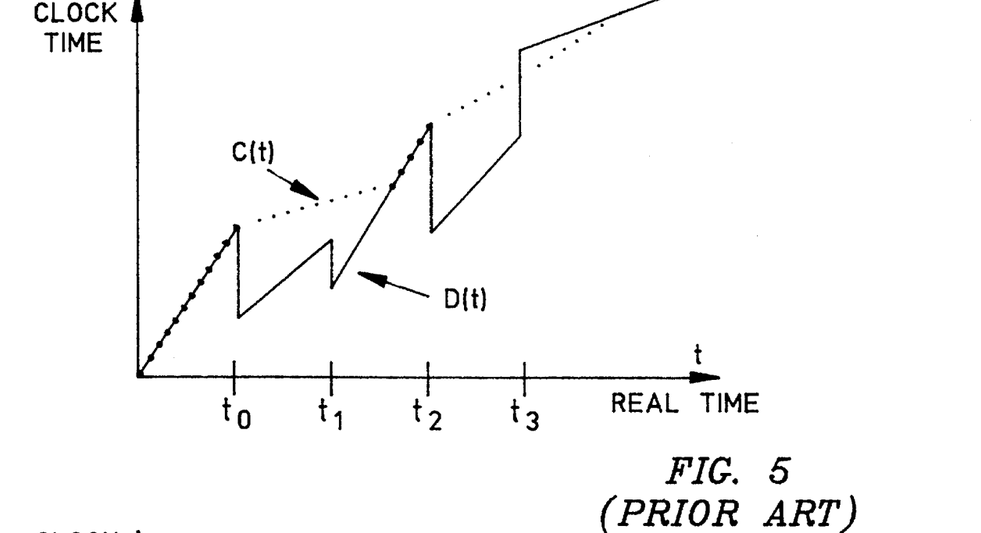
FIG. 5 is a chart illustrating a discrete logical clock and a continuous logical clock under external clock synchronization.

FIG. 5 provides an example of a discrete logical clock D(t) compared with an amortized logical clock C(t) under external clock synchronization. Discrete logical clock D is adjusted at times $t_0$, $t_1$, $t_2$ and $t_3$. Continuous logical clock C spreads the first adjustment at time $t_0$ over an interval that extends beyond the next synchronization event at time $t_1$. At time $t_3$, the previous amortization interval has not yet ended but the new positive adjustment is large enough to bring discrete logical clock D ahead of the continuous logical clock C. Thus, at time $t_3$ the amortizing clock adjuster switches from negative amortization (C running slower than the hardware clock) to positive amortization (C running faster than the hardware clock). Nevertheless, continuous clock C always remains within the same precision bounds with respect to the reference time-of-day $T_R$ as does the logical clock D, provided that the amortization rate α is no smaller than the maximum drift rate of the hardware clock, as may be appreciated from FIG. 5 and the above-cited Schmuck et al. reference.

Figure 6:
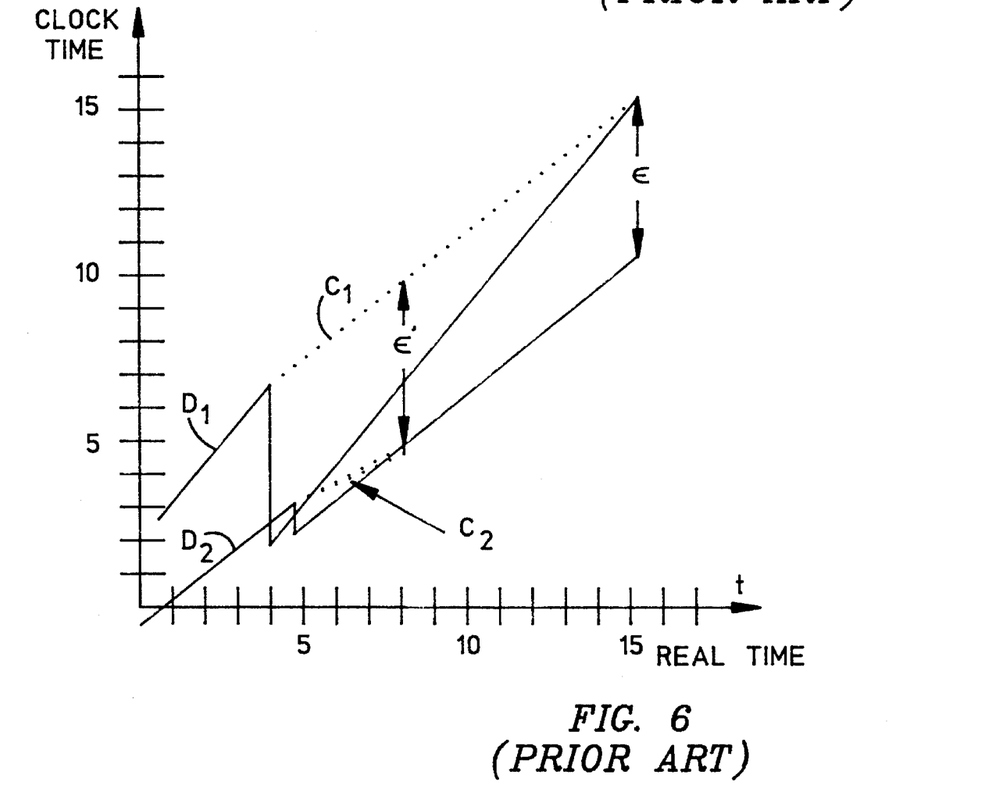
FIG. 6 is a chart illustrating an amortized continuous logical clock from the prior art that does not preserve precision under internal clock synchronization.

FIG. 6 illustrates the operation of an internally synchronized clock system wherein amortization results in degradation of the synchronization precision available from discrete clock adjustment, even where limitations are placed on amortization rate α. Two discrete logical clocks $D_1$ and $D_2$ and two continuous logical clocks $C_1$ and $C_2$ representing two remote processor sites are shown in FIG. 6. In this example, the maximum drift rate of the hardware clocks is 20%. Thus, if the clock at the first processor site runs 120% faster than real-time and the clock at the second processor site runs 120% slower than real-time, then the maximum relative drift rate at which the two hardware clocks drift apart from each other is 44%. As shown in FIG. 6, discrete logical clocks $D_1$ and $D_2$ are internally synchronized within a maximum deviation of $\epsilon$=4.5 clock time units.

The dotted lines illustrate the replacement of a discrete clock adjuster at each site with an amortizing clock adjuster having an amortization rate of a = 0.5 in each of the two distributed processors. FIG. 6 shows that replacing discrete clock adjusters with amortizing clock adjusters causes an increase in the internal synchronization deviation from $\epsilon=4.5$ to $\epsilon'=5.1$ clock time units at time t=8.73. Thus, precision preservation in the internal clock synchronization system of FIG. 1 requires (a) the amortization to end before the next resynchronization event and (b) the two clocks $C_1$ and $C_2$ to drift no further apart during amortization, as proven formally by Schmuck et al. in the above-cited reference.

The Invention

Figure 2:
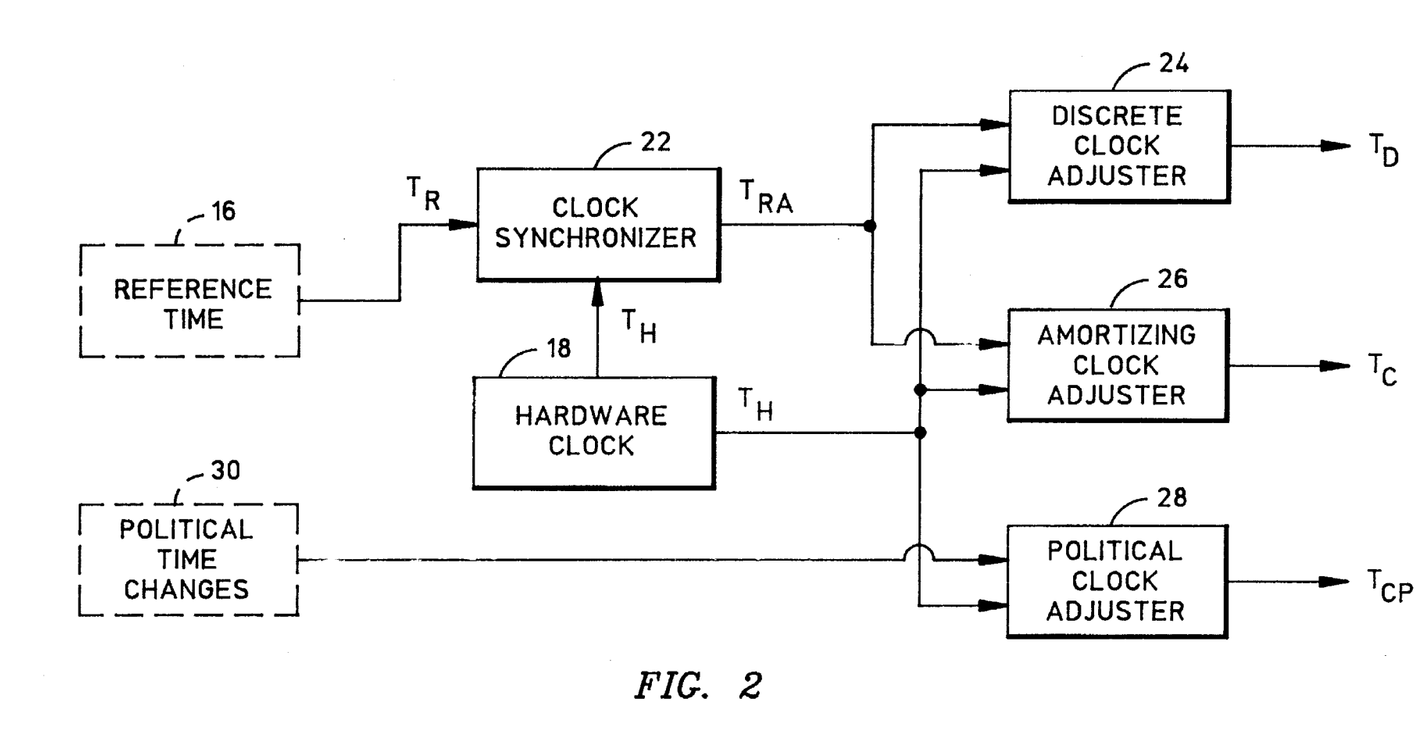
FIG. 2 is a functional block diagram of an illustrative embodiment of the clock synchronization system of this invention.

FIG. 2 is a functional block diagram of an exemplary embodiment of the clock synchronization system of this invention. As in FIG. 1, clock synchronizer 22 periodically read $T_R$ from reference time source 16 and creates adjusted reference time-of-day $T_{RA}$. Hardware clock 18 operates to create hardware clock time-of-day $T_H$ in the same manner as in FIG. 1.

Several logical clocks are provided, each including a clock adjuster. These include a discrete clock adjuster 24, an amortizing clock adjuster 26 and a political clock adjuster 28. Because certain smoothness properties are required in logical time-of-day values by some applications despite the abruptness of the discrete corrections required by discrete clock adjuster 24, the system of this invention includes a second logical clock object consisting in part of amortizing clock adjuster 26. By using a first logical clock consisting in part of discrete clock adjuster 24 and a second logical clock consisting in part of amortizing clock adjuster 26, the clock synchronization function is decoupled from the clock amortizing function, thereby overcoming the degradation of precision arising from amortization intervals longer than the interval between resynchronizing events. A third logical clock object consisting in part of political clock adjuster 28 allows discrete political time-of-day adjustments to the continuous time-of-day $T_C$ when appropriate for the application. That is, political clock adjuster 28 can add leap seconds or daylight savings time changes received from an external source 30 to the continuous monotonically non-decreasing time $T_C$ from amortizing clock adjuster 26 to create a smooth politically-corrected time-of-day $T_{CP}$.

Clock synchronizer 22 in FIG. 2 may also include a hardware clock drift compensater (FIG. 8) that operates to adjust the effective base rate of hardware clock 18 responsive to detected synchronization errors so that output $T_{RA}$, A advances between adjacent resynchronizing events at a base rate adjusted with respect to hardware clock 18. The effect of exemplary base rate adjustments to hardware clock 18 is seen in the varying slope of discrete logical clock D(t) of FIG. 5.

Figure 7:
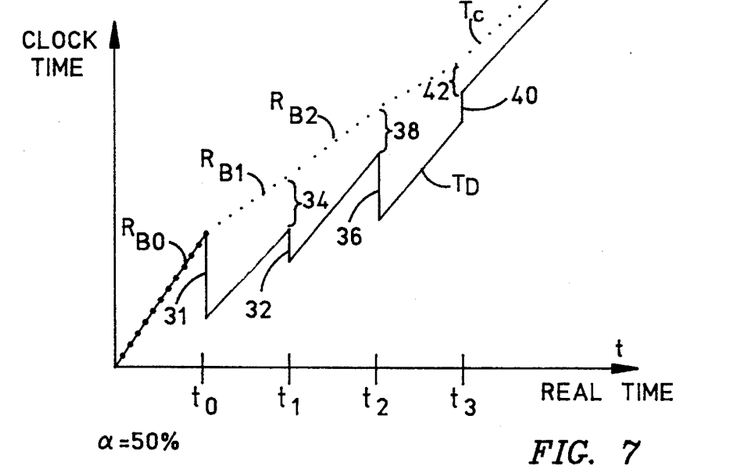
FIG. 7 is a chart illustrating the operation of the logical clocks of this invention.

The operation of the system in FIG. 2 can be understood with reference to the diagram in FIG. 7. FIG. 7 illustrates external synchronization of the system in FIG. 2. Amortizing clock adjuster 26 operates to produce continuous time-of-day $T_C$ by amortizing corrections over a predetermined amortization interval determined by an amortization rate $\alpha$, as discussed above in connection with FIGS. 4–6.

The base rate of the hardware clock is labeled $R_{B0}$ in FIG. 7. The discrete logical clock time $T_D$ retains this hardware clock base rate over all time intervals shown. The continuous logical clock output $T_C$ exhibits different base rates depending on the amortization required. For instance, the base rate is reduced from $R_{B0}$ to base rate $R_{B1}$ in the interval from times $t_0$ to $t_1$, at which time the rate is further reduced to $R_{B2}$. Thus, the continuous time $T_C$ retains piece-wise linearity but shows different base rates that depend on the adjustments undergoing amortization. When the discrete logical clock is externally synchronized, the base rate of $T_D$ may also vary depending on an estimated difference between the external time reference base rate and the hardware clock base rate.

At time $t_0$, $T_D$ is adjusted downward in FIG. 7 by a step 31. Discrete step 31 is then used to compute the base rate change to the second logical clock so that $T_C$ slows down enough to intersect $T_D$ at about time $t_2$. That is, the amortization interval is, for illustrative purposes, about twice the resynchronization interval. At time $t_1$, $T_D$ is again adjusted downward by a smaller step 32. At the same time $t_1$, there is a non-amortized difference 34 remaining in the second logical clock time $T_C$. The sum of difference 34 and step 32 are used in amortizing clock adjuster 26 to restart the amortization interval, which now extends from times $t_1$ to $t_3$.

Similarly, at time $t_2$, $T_D$ is adjusted by a step 36 while a difference 38 remains unamortized on the second logical clock. Again, the sum of difference 38 and step 36 are used by amortizing clock adjuster 26 to restart the amortization interval at time $t_2$, extending it to time $t_4$. That is, the base rate of the second logical clock is changed to permit full amortization of both step 36 and difference 38 within the interval between times $t_2$ and $t_4$. Finally at time $t_3$, $T_D$ is positively adjusted by step 40, indicating a change in hardware drift rate is sufficient to change the polarity of the resynchronization adjustment. At time $t_3$, the non-amortized difference 42 is again added to the step 40 (actually subtracted because of the sign difference of step 40) to restart the amortization once again. This process proceeds indefinitely and is made possible by the separation of the synchronization and amortization functions into two logical clock objects as shown in FIG. 2.

Figure 8:
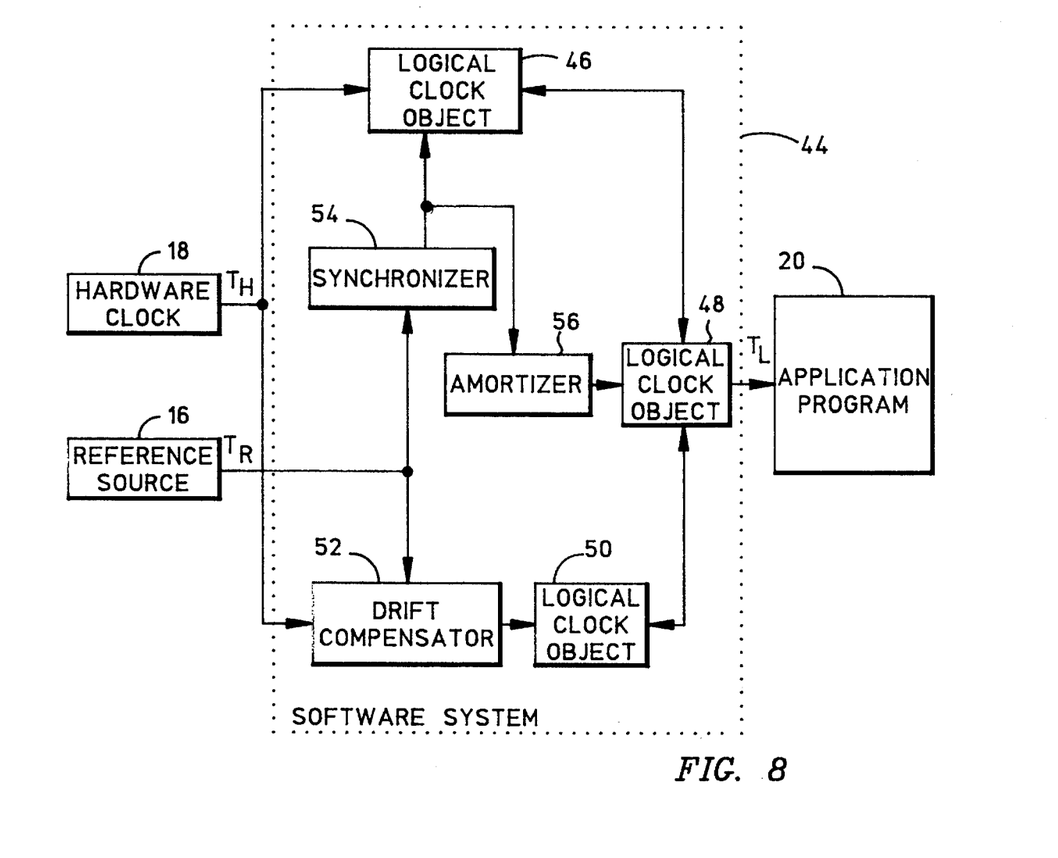
FIG. 8 is a functional block diagram of an exemplary embodiment of the system of this invention.

FIG. 8 shows another functional block diagram illustrating the clock synchronization system of this invention wherein the system is embodied as a software system 44 coupled to reference source 16 and hardware clock 18. Software system 44 includes several logical clock objects 46, 48 and 50 coupled to a drift compensater 52, which estimates the base rate change necessary to hardware clock 18 to overcome linear synchronization error. System 44 also includes a synchronizer 54, which calculates the adjustments necessary to the hardware clock offsets for each of the several logical clock objects 46–50 at each resynchronization event. Finally, system 44 includes an amortizer 56, which develops the amortization time intervals necessary for smoothness and monotonicity in the continuous logical clock object 48. Logical clock object 48 provides the continuous logical clock time value $T_L$ required by application program 20.

The inventor has developed two preferred embodiments for the logical clock object 48. Table 1 below provides a simple C-code listing of a preferred simple logical clock object of this invention.

TABLE 1

Simple Logical Clock Object

```
#include <float.h>
#define amort (((t - a_begin) *a_rate) *sign)
double
    add,                    /*amount to add to hardware clock          */
    a_rate,                 /*amortization rate ( between 0 and 1 )    */
    c_rate,                 /*time rate                                */
    c_begin,                /*beginning time for amortization          */
    a_end,                  /*ending time for amortization             */
    adjustment,             /*amount to be amortized                   */
    sign,                   /*-1 if adjustment negative, 1 otherwise   */
    t;                      /*a time value                             */
double Time() {             /*returns the logical time                 */
    t = c_rate*hardclock();
    if (t < a_end) {t + =(add + amort);}
    else {t +=(add + adjustment);}
    return t;}
void Adjust(double new_adjustment){  /*adjusts the logical clock      */
    t = c_rate*hardclock();
    if (t < a_end){
        add +=amort;
        adjustment +=new_adjustment - amort;}
    else {
        add +=adjustment;
        adjustment =new_adjustment;}
    if (adjustment <0.0) {sign = -1.0;}
    else {sign = 1.0;}
    a_begin = t;
    a_end = a_begin + (adjustment/(a_rate*sign));}
void Set(double new_time){  /*sets clock with no amortization          */
    t = Time();
    add +=new_time - t;
    adjustment = 0.0;       /*cancels any current amortization         */
    Adjust(0.0);}           /*removes amortization interval            */
void Change_offset(double add_to_offset }  /*adds add_to_offset to add */
    add +=add_to_offset;}
void Change_rate(double mult_by_rate){  /*multiplies c_rate by mult_by_rate */
    Adjust(0.0);            /*puts amount of any unfinished            */
                            /*amortization in adjustment               */
    c_rate* = mult_by_rate;
    a_begin = mult_by_rate;
    a_end +=a_begin - t;}
void LClock_init(double offset, double amortization_rate, double rate){
    add = offset;
    a_rate = amortization_rate;
    c_rate = rate;
    a_end = (a_begin = (t = c_rate*hardclock()));
    adjustment = 0.0;
    sign = 1.0;}
```

The functions and data structure of the simple logical clock object of Table 1 are now described. The LClock$_{13}$ init function creates a logical clock object by recording the three input parameter values such that offset=add, amortization$_{13}$ rate=a_rate and base rate=c_rate. The current value of the hardware clock is returned by the function hardclock, which takes no arguments. For simplicity, each call to hardclock is followed by multiplying the return value by $c_{13}$ rate and the result of this multiplication is stored as variable t.

Amortization is accommodated by storing the amount of the current adjustment as adjustment and storing the beginning and end of the current amortization interval in $a_{13}$ begin and a_end, respectively. These times refer to the hardware time after multiplication by c_rate. Thus, a test for ongoing amortization can be made by testing whether t lies in the interval [$a_{13}$ begin, a_end]. Amortization is always started immediately when requested. If an amortization is already underway, the ongoing amortization is halted and a new one restarted with an adjustment to compensate for the earlier incomplete amortization procedure. Thus, in the logical clock of the object of this invention, there is always at most one ongoing amortization interval. Because the values returned by hardclock are monotonically non-decreasing with respect to real-time, finding t<a_end always confirms that the current amortization interval is incomplete.

When there is no current amortization and the value adjustment is zero then the logical time $T_L$ returned by the Time function is merely t+add. During an amortization, the logical time $T_L$ =t+add+(t-$a_{13}$ begin)/(a_end-$a_{13}$ begin)*adjustment. Note that at the end of the amortization interval, when t=a_end, this expression simplifies to $T_L$ =t+add+adjustment. To avoid any requirement for a decision at t=a_end, the logical clock object of this invention employs $T_L$ =t+add+adjustment as the usual expression for the value to be returned by the Time function, even when there is no current amortization. Thus, the logical clock object of this invention does not require any changes to the value of stored variables until resynchronization forces a new adjustment.

Next, the length of the amortization interval is used to provide the amortization rate specified as a_rate. Note that the necessary multiplier (and first derivative of Time with respect to t) during an amortization interval is 1+(adjustment)/(a_end-$a_{13}$ begin). Thus, the length of the amortization interval is merely adjustment/a_rate and the sign of the multiplier is the same as that for adjustment. The problem of handling this sign is simplified in the logical clock object of this invention by recording in an extra storage location a sign equal to +1 for non-negative adjustments and −1 for negative adjustments. With this arrangement, the value of a_end is defined as shown in Equation 1 below.

$$a\_end = \frac{adjustment}{a\_rate * sign} - a\_begin \qquad [\text{Eqn. 1}]$$

Employing Eqn. 1, the final simplified expression for the value to be returned by the Time function is given by Eqns. 2A–2B below.

$$T_L = t + add + \frac{t - a\_begin}{a\_end - a\_begin} * adjustment \qquad [\text{Eqn. 2A}]$$

$$T_L = t + add + (t - a\_begin) * a\_rate * sign \qquad [\text{Eqn. 2B}]$$

The above analysis is valid provided that a_rate>0 and a_rate is held<1 to avoid negative adjustments of logical time $T_L$, thereby ensuring monotonically non-decreasing logical time-of-day.

Thus, the logical time $T_L$ return by the Time function can be written alternatively as shown below in Eqns. 3A–3B.

$$\text{for } t < a\_end, \; T_L = t + add + (t - a_{13} \, begin) * a\_rate \, sign \qquad [\text{Eqn. 3A}]$$

$$\text{otherwise, } T_L = t + add + adjustment \qquad [\text{Eqn. 3B}]$$

When the Adjust(new_adjustment) function is called (See Table 1 above), the resulting operations on the logical clock object depend on whether there is an ongoing amortization (i.e., t<a_end). If there is an ongoing amortization, the current adjustment must be broken into the portion amort already applied and the non-amortized difference (adjustment-amort) remaining. The applied portion amort is added to add and the remaining difference is combined with new_adjustment to produce a new value for adjustment. Defining a temporary variable amort to hold the completed portion of the amortization, this calculation is summarized below in Eqns. 4A–4C.

$$amort = (t - a_{13} \, begin) * a\_rate * sign \qquad [\text{Eqn. 4A}]$$

$$add = add + amort \qquad [\text{Eqn. 4B}]$$

$$adjustment = adjustment + new\_adjustment - amort \qquad [\text{Eqn. 4C}]$$

After amortization is complete, the fully amortized adjustment is absorbed into add and the value of adjustment is set to new_adjustment as shown in Table 1 and Eqns. 5A–5B below.

$$add = add + adjustment \qquad [\text{Eqn. 5A}]$$

$$adjustment = new\_adjustment \qquad [\text{Eqn. 5B}]$$

In both cases sign is recomputed to conform to the sign of adjustment and a new amortization period is established beginning at t and ending at the value for a_end obtained from Eqn. 1 above.

When Set(new_time) is called, the result is to call Adjust(0) after computing a new add such that the resulting current logical time will be new_time and after zeroing adjustment to cancel any current amortization as summarized in Eqns. 6A–6C.

$$add = add + new\_time - Time \qquad [\text{Eqn. 6A}]$$

$$adjustment = 0 \qquad [\text{Eqn. 6B}]$$

$$Adjust(0) \qquad [\text{Eqn. 6C}]$$

When Change_offset(add_to_offset) is called, the result is to combine add and add_to_offset to produce the new add with no other effects.

When Change_rate(mult_by_rate) is called, any current adjustment is stopped and any incomplete part is restarted at the new rate, so Adjust(0) is first called. Then c_rate is multiplied by mult_by_rate. Finally, the new amortization interval is adjusted for the new rate. Note that the size of the amortization interval does not change. It is simply moved to begin at the current value of c_rate*hardclock(), which has changed. These steps are summarized in Eqns. 7A–7D.

$$Adjust(0) \qquad [\text{Eqn. 7A}]$$

$$c\_rate = c\_rate * mult\_by\_rate \qquad [\text{Eqn. 7B}]$$

$$a\_begin = a\_begin * mult\_by\_rate \qquad [\text{Eqn. 7C}]$$

$$a\_end = a\_end + a\_begin - t \qquad [\text{Eqn. 7D}]$$

In Eqn. 7D, the value of t computed immediately following execution of the function in Eqn. 7A is used to determine by how much a_begin has moved and to move a_end by the same amount.

A second preferred embodiment of the logical clock object of this invention is specified below in Table 2 in the form of a C-code listing. Table 2 defines an optimized logical clock object designed to minimize the path for the Time function. This is appropriate for use when the Time function must be called more often than the other functions or where it is used frequently in code requiring optimization. The Time function in Table 2 is optimized to three operations only (one compare, one multiply and one add) for each function call. To effect this optimization, the simple logical clock object discussed above in connection with Table 1 is modified to postpone multiplication by c_rate. Accordingly, in Table 2, the variable t represents the value returned by the function hardclock before multiplication and not of the product of the return value and c_rate. The code from Table 1 above is transformed by preserving the relevant semantics and all the old variable names while adding new ones as required. Finally, unneeded variable names are suppressed in the final optimized logical clock object data structure code in Table 2.

TABLE 2

```
#include <float.h>
#define amort (((t - a_begin) *a_rate) *sign)
double
    add,            /*amount to add to hardware clock       */
    a_rate,         /*amortization rate ( between 0 and 1 ) */
    c_rate,         /*time rate                             */
```

TABLE 2-continued

```
    adjustment,              /*amount to be amortized              */
    sign,                    /*-1 if adjustment negative, 1 otherwise */
    a_begin,                 /*begin amort. time * c_rate           */
    t_end,                   /*end amort. time                      */
    t                        /*a time value                         */
    mult                     /*multiplier of time during amort.     */
    dim                      /*added to time during amort.          */
    addt;                    /*added to time when no amort.         */
double Time(){               /*returns the logical time             */
    t = hardclock();
    if (t < t_end) {t = (t * mult) + diff;}
    else {t = (t * c_rate) + addt;}
    return t;}
void Adjust(double new_adjustment){  /*adjusts the logical clock   */
    t = hardclock();
    if (t < t_end){
        add +=amort;
        adjustment +=new_adjustment − amort;}
    else {
        add +=adjustment;
        adjustment =new adjustment;}
    if (adjustment <0.0) {sign =−1.0;}
    else {sign = 1.0;}
    mult =c_rate * (1.0 + (a_rate * sign));
    a_begin = t * c_rate;
    t_end = t + (adjustment/(c_rate * (a_rate * sign)));
    diff = add − (a_begin * (a_rate * sign));
    addt = add + adjustment;}
void Set(double new_time){   /*sets clock with no amortization      */
    t = Time();
    add +=new_time − t;
    adjustment = 0.0;        /*cancels any current amortization     */
    Adjust(0.0);}            /*removes amortization interval        */
void Change_offset(double add_to_offset){
    add +=add_to_offset;
    diff +=add_to_offset;
    addt +=add_to_offset;}
void Change_rate(double mult_by_rate){ /*multiplies c_rate by mult_by_rate */
    Adjust(0.0);             /*puts amount of any unfinished        */
                             /*amortization in adjustment           */
    c_rate * = mult_by_rate;
    a_begin * = mult_by_rate;
    t_end +=((mult_by_rate − 1.0) * t;
    mult = c_rate * (1.0 + (a-rate * sign));}
void LClock_init(double offset, double amortization_rate, double rate){
    add = offset;
    a_rate = amortization_rate;
    c_rate = rate;
    t_end = (t = hardclock());
    a_begin = t * c_rate;
    adjustment = 0.0;
    sign = 1.0;
    mult = c_rate * (1.0 + (a_rate * sign));
    diff = add − (a_begin * (a_rate * sign));
    addt = add + adjustment;
```

The structure of the optimized logical clock object of Table 2 are now described. The end points of the amortization interval on the new t scale (as opposed to the previous c_rate *t scale) are t_begin and t_end, where $$t\_begin * c\_rate = a\_begin \quad \text{[Eqn. 8A]}$$

$$t\_end * c\_rate = a\_end \quad \text{[Eqn. 8B]}$$

The multiplier for t during amortization is defined as mult and the amount to be added is defined as diff. When there is no amortization, the multiplier is defined as c_rate and the amount to be added is addt. Thus, the functional representation for Time is now given by Eqns. 9A–9B.

$$\text{for } t < t\_end \; T_L = t * mult + diff \quad \text{[Eqn. 9A]}$$

$$\text{otherwise, } T_L = t * c\_rate + addt. \quad \text{[Eqn. 9B]}$$

Combining Eqns. 9A–9B with Eqns. 3A–3B above produces Eqns. 10A–10C.

$$mult = c\_rate * (1 + (a\_rate * sign)) \quad \text{[Eqn. 10A]}$$

$$diff = add − (a\_begin * a\_rate * sign) \quad \text{[Eqn. 10B]}$$

$$addt = add + adjustment \quad \text{[Eqn. 10C]}$$

When Adjust(new_adjustment) is called and t<t_end indicating that there is an ongoing amortization, add is incremented by amort and adjustment is decremented by (new_adjustment—amort) as before. Otherwise, add is incremented by adjustment and adjustment is set to new_adjustment. Thus Eqns. 4A–5B continue to apply to this optimized object. Because adjustment may have been changed, sign must conform to and mult must be recomputed according to Eqn. 10A. Then the new amortization interval is given by Eqns. 11A–11B and 12A–12B for both time scales.

$$t\_begin = t \quad [\text{Eqn. 11A}]$$

$$a\_begin = t * c\_rate \quad [\text{Eqn. 11B}]$$

$$a\_end = a\_begin + \frac{adjustment}{a\_rate * sign} \quad [\text{EQN. 12A}]$$

$$t\_end = \frac{a\_end}{c\_rate} \quad [\text{Eqn. 12B}]$$

In this optimized implementation, a_begin and t_end alone are sufficient so Eqn. 11B above and Eqn. 13 below are sufficient.

$$t\_end = t + \frac{adjustment}{c\_rate * a\_rate * sign} \quad [\text{Eqn. 13}]$$

Finally diff is computed according to Eqn. 10B and addt is computed according to Eqn. 10C.

When Set(new_time) is called, the operations are exactly as before because the call to Adjust(0) recomputes all the relevant variables.

When Change_offset(add_to_offset) is called, the variables in Eqns. 14A–14C below are computed.

$$add = add + add\_to\_offset \quad [\text{Eqn. 14A}]$$

$$diff = diff + add\_to\_offset \quad [\text{Eqn. 14B}]$$

$$addt = addt + add\_to\_offset \quad [\text{Eqn. 14C}]$$

When Change_rate(mult_by_rate) is called, Adjust(0) is called as before to put the amount of any unfinished amortization into adjustment and to put the current hardware time into t. Then C_rate is multiplied by the factor mult_by_rate and the amortization interval, mult, diff, and addt are recomputed. These steps are summarized in Eqns. 15A–5D below.

$$Adjust(0) \quad [\text{Eqn. 15A}]$$

$$c\_rate = c\_rate * mult\_by\_rate \quad [\text{Eqn. 15B}]$$

$$a\_begin = a\_begin * mult\_by\_rate \quad [\text{Eqn. 15C}]$$

$$t\_end = t\_end = ((mult\_by\_rate - 1) * t \quad [\text{Eqn. 15D}]$$

Eqn. 15D is obtained by combining Eqns. 12B and 7D. Variable mult is recomputed according to Eqn. 10A. Variables diff and addt need not be recomputed because no terms in Eqns. 10B–10C have changed since the call to Adjust(0). When LClock_init(offset, amortization_rate, rate) is called, the expanded data structure logical clock is allocated as the following variables:

add of type time, a_rate of type time between 0 and 1, c_rate of type positive time, adjustment of type time, sign either 1 or −1, a_begin of type time, t_end of type time, t of type time, mult of type time, diff of type time, and addt of type time.

Clearly, other embodiments and modifications of this invention will occur readily to those of ordinary skill in the art in view of these teachings. Therefore, this invention is to be limited only by the following claims, which included all such embodiments and modifications when viewed in conjunction with the above specification and accompanying drawing.

I claim:

1. In a system including a hardware clock and plurality of logical clock objects, each logical clock object having a base rate, an amortization rate and a time with an offset relative to said hardware clock time, a computer implemented method for managing a first logical clock object of the plurality of logical clock objects, the first logical clock object having a first base rate, a first amortization rate, and a first logical clock object time with a first offset relative to said hardware clock time, said first logical clock time never differing by more than a predetermined deviation from a reference time, said method comprising the steps of:

(a) adjusting a second offset in a second logical clock object of the plurality of logical clock objects to synchronize a second logical clock object time to said reference clock time; and (b) adjusting said first offset by amortizing an adjustment at said first amortization rate to synchronize said first logical clock object time to said second logical clock object time such that said first logical clock object time increases monotonically.

2. The method of claim 1, wherein said second adjusting step (b) comprises the additional steps of:

(b.1) comparing said hardware clock time to said first logical clock object time to determine whether said first offset includes all earlier said adjustments;

(b.2) if said first offset does not include all said earlier adjustments, halting said amortizing and (b.3) adjusting said first offset by amortizing a cumulative adjustment at said first amortization rate to synchronize said first logical clock object time to said second logical clock object time, wherein said cumulative adjustment includes a portion of said earlier adjustments not yet amortized.

3. The method of claim 2 wherein said first logical clock object time increases continuously.

4. The method of claim 3, wherein said first adjusting step (a) comprises the additional steps of:

(a.1) setting a third base rate for a third logical clock object of the plurality of logical clock objects, the third base rate equal to an estimated difference between base rates of said hardware clock and said reference clock;

(a.2) adjusting a third offset to synchronize said third logical clock object time to said reference clock time; and (a.3) adjusting said second offset to synchronize said second logical clock object time to said third logical clock object time.

5. The method of claim 2, wherein said first adjusting step (a) comprises the additional steps of:

(a.1) for a third logical clock object of the plurality of logical clock objects, setting a third base rate equal to an estimated difference between base rates of said hardware clock and said reference clock;

(a.2) adjusting a third offset to synchronize said third logical clock object time to said reference clock time; and (a.3) adjusting said second offset to synchronize said second logical clock object time to said third logical clock object time.

6. The method of claim 1 wherein said first logical clock object time increases continuously.

7. The method of claim 1, wherein said first adjusting step (a) comprises the steps of:

(a.1) for a third logical clock object of the plurality of logical clock objects, setting a third base rate equal to an estimated difference between base rates of said hardware clock and said reference clock;

(a.2) adjusting a third offset to synchronize said third logical clock object time to said reference clock time; and (a.3) adjusting said second offset to synchronize said second logical clock object time to said third logical clock object time.

8. The method of claim 1 further comprising the step of:

(c) adding to said first offset a discrete adjustment representing a political revision to said reference clock time, thereby synchronizing said first clock object time to an external political time.

9. A clock synchronization system for providing a smooth first logical clock time that never differs by more than a predetermined deviation from a reference clock time, said system comprising:

hardware clock means having a hardware clock rate for producing a hardware clock time;

first logical clock means having a first base rate and a first amortization rate for producing said first logical clock time;

second logical clock means having a second base rate coupled to said hardware clock means and to said first logical clock means for producing a second logical clock time having a first offset from said first logical clock time and a second offset from said hardware clock time;

synchronizing means coupled to said second logical clock means for adjusting said second offset to synchronize said second logical clock time to said reference clock time; and amortizing means coupled to said first logical clock means for adjusting said first offset at said first amortization rate to synchronize said first logical clock time to said second logical clock time such that said first logical clock time increases monotonically.

10. The clock synchronization system of claim 9 wherein said amortizing means comprises:

comparing means for comparing said hardware clock time to said first logical clock time to determine whether said first offset includes all earlier said adjustments;

accumulating means coupled to said comparing means for adding the portion of said earlier adjustments not yet included in said first offset to a new adjustment to create a cumulative adjustment; and restarting means coupled to said accumulating means for adjusting said first offset by said cumulative adjustment at said first amortization rate to synchronize said first logical clock time to said second logical clock time.

11. The clock synchronization system of claim 10 wherein said first logical clock time increases continuously.

12. The clock synchronization system of claim 11 further comprising:

third logical clock means coupled to said hardware clock means for producing a third logical clock time having a third base rate;

drift compensation means coupled to said third logical clock means for setting said third base rate equal to an estimated difference between said hardware clock rate and the base rate of said reference clock; and estimation means coupled to said second logical clock means and to said third logical clock means for adjusting said second offset to synchronize said second logical clock time to said third logical clock time.

13. The clock synchronization system of claim 10 further comprising:

third logical clock means coupled to said hardware clock means for producing a third logical clock time having a third base rate;

drift compensation means coupled to said third logical clock means for setting said third base rate equal to an estimated difference between said hardware clock rate and the base rate of said reference clock; and estimation means coupled to said second logical clock means and to said third logical clock means for adjusting said second offset to synchronize said second logical clock time to said third logical clock time.

14. The clock synchronization system of claim 9 wherein said first logical time increases continuously.

15. The clock synchronization system of claim 9 further comprising:

third logical clock means coupled to said hardware clock means for producing a third logical clock time having a third base rate;

drift compensation means coupled to said third logical clock means for setting said third base rate equal to an estimated difference between said hardware clock rate and the base rate of said reference clock; and estimation means coupled to said second logical clock means and to said third logical clock means for adjusting said second offset to synchronize said second logical clock time to said third logical clock time.

16. The clock synchronization system of claim 9 further comprising:

political adjustment means coupled to said first logical clock means for adding a discrete adjustment to said first offset representing a political revision to said reference clock time, thereby synchronizing said first logical clock time to an external political time.

17. The clock synchronization system of claim 9 wherein said synchronizing means is for the discrete adjustment of said second offset without amortization.

18. A computer-implemented clock comprising:

a hardware clock for producing a hardware clock time signal $T_H$;

means for storing a plurality of logical clock data objects, each said logical clock data object including a time signal value $T_L$, an offset ADD to said hardware clock time signal $T_H$, an amortization rate aRATE having a value in the interval, a base rate cRATE of increase in said time value $T_L$, an adjustment ADJ to said offset ADD to be amortized, a bit SIGN representing the sign of said adjustment ADJ, a beginning amortization time aBEGIN, an ending amortization time tEND, a multiplier MULT of said time value $T_H$ during amortization, and an unamortized adjustment amount DIFF remaining during amortization; and means for producing said logical clock time signal $T_L$=MULT*$T_H$+DIFF if said hardware clock time signal $T_H$<tEND and for producing said logical clock time signal $T_L$=cRATE*$T_H$+ADD+ADJ otherwise.

19. The computer-implemented clock of claim 18 further comprising:

means for initializing said each logical clock data object such that said ending amortization time tEND=$T_H$, said beginning amortization time aBEGIN= $T_H$*cRATE, said adjustment ADJ=0.0, said bit SIGN=1, said multiplier MULT=cRATE(aRATE*SIGN)), and said difference DIFF=ADD− (aBEGIN*aRATE*SIGN).

* * * * *

UNITED STATES PATENT AND TRADEMARK OFFICE
CERTIFICATE OF CORRECTION

PATENT NO.   :   5,530,846
DATED        :   June 25, 1996
INVENTOR(S)  :   Strong It is certified that error appears in the above-indentified patent and that said Letters Patent is hereby corrected as shown below:

Column 18, line 39, add --[0,1]-- between "interval" and the comma.

Signed and Sealed this

Twenty-fourth Day of September, 1996

Attest:

BRUCE LEHMAN

Attesting Officer    Commissioner of Patents and Trademarks